2 Sheets--Sheet 1.
H. C. BUTLER.
Gang-Saw Hangers.
No. 148,032. Patented March 3, 1874.
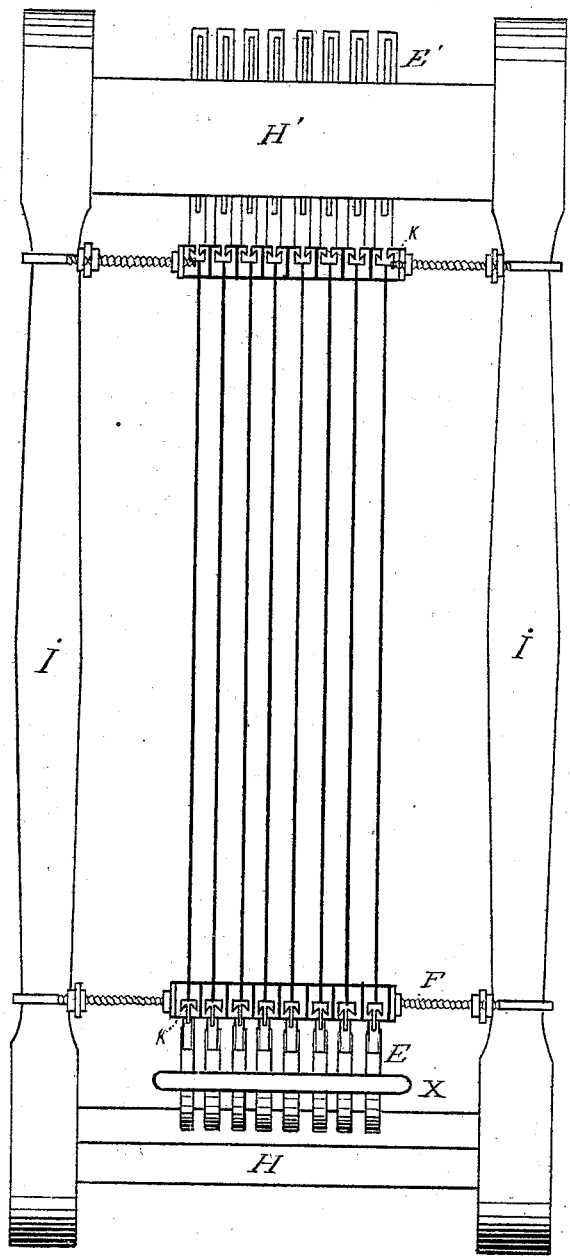

2 Sheets--Sheet 2.
H. C. BUTLER.
Gang-Saw Hangers.
No. 148,032. Patented March 3, 1874.
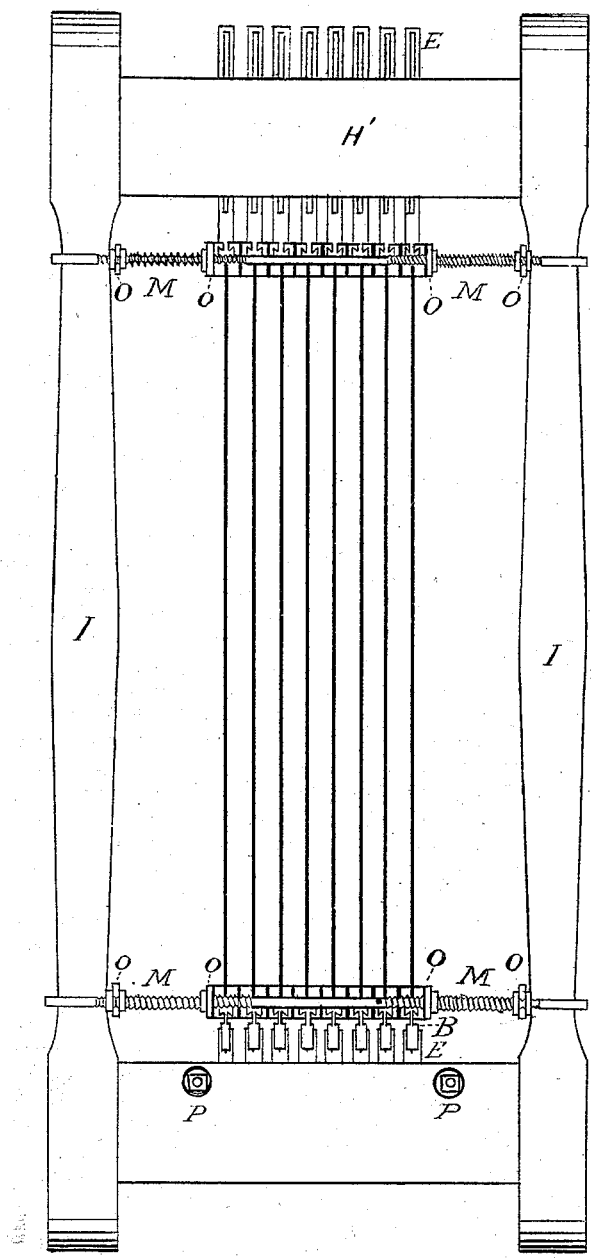
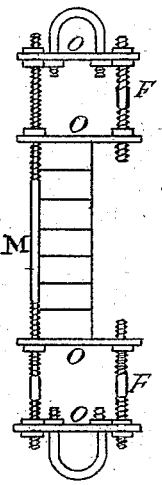
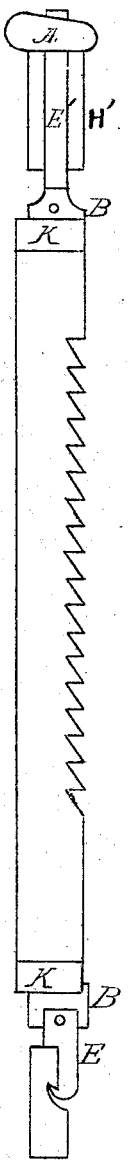
Witnesses: Will. H. Moon, John C. Klink
Inventor: Henry C. Butler
per attys. A. H. & R. K. Evans.

UNITED STATES PATENT OFFICE.

HENRY C. BUTLER, OF MINNEAPOLIS, MINNESOTA.

IMPROVEMENT IN GANG-SAW HANGERS.

Specification forming part of Letters Patent No. 148,032, dated March 3, 1874; application filed January 12, 1874.

*To all whom it may concern:*

Be it known that I, HENRY C. BUTLER, a resident of the city of Minneapolis, county of Hennepin and State of Minnesota, have invented a new and Improved Gang-Saw Hanger, of which the following is a specification:

Figure 1 is a front view of a gang of saws hung with my device. Fig. 2 is a back view of the same, and Figs. 3, 4, and 5 are detail views.

The frame or gate is designated by the letters H I H'. H' is the upper cross-bar, and is composed of two parallel bars with a space between them equal to the width of the hanger-bar E', as shown in Fig. 3. Letters K are pieces of metal permanently attached to the saws at both ends, their thickness being the gage of their separation. The pieces K are slotted to receive the T-shaped heads of the pieces B, the slots and heads being beveled, as shown in detail, Fig. 5. Attached by a loose joint to the T-headed pieces B is the hook E, by which the lower end of the saw is attached to the cross-bar H. In the top hanger the piece E is replaced with the hanger-bar E', which has a slot in its upper end to receive the wedge A, which rests upon the double cross-bar H', and is used to produce the necessary amount of strain upon the saw. The object of hinging the pieces B to the pieces E and E' is to produce a uniform strain upon the saw when set in an inclined position. The rods M extend across the saw-gate in the rear of the pieces K, and are used as gages in placing the saws in position. The rods F extend from the standards I to the saws, and are parallel to the rods M. Connecting the rods M and F are four pieces, O O O O, through which the rods M F pass, threads being cut on the rods and nuts placed thereon with the pieces O as a backing. A double press is formed, by which the pieces K are pressed firmly together, holding the saws in a parallel and vertical position. X is a bar held in position by two bolts, P P, which pass through to the back of the cross-bar H, and hold the lower hanger or pieces E and B in place while the saws are being changed.

The object of my invention is to secure a perfectly uniform strain upon the saws when in an inclined position, thereby increasing the utility of both saw and hanger, and to secure a firm and unyielding separation of the saws, that they may be held in a parallel, vertical, and unvarying position, and also to secure as much economy of time as is consistent with with perfect working mechanism.

Having thus described my invention, what I claim, and wish to secure by Letters Patent, is—

1. In combination with the rods M, the rods F F and connecting-bars O O O O, substantially as and for the purpose set forth.

2. In combination with the rods M and F F and the connecting-bars O O O O, the bevel-slotted pieces K K and the saw-frame H I H', substantially as and for the purpose set forth.

HENRY C. BUTLER.

Witnesses:
T. M. COMSTOCK,
VERNON BELL.